US008243982B2

(12) United States Patent
Fan et al.

(10) Patent No.: US 8,243,982 B2
(45) Date of Patent: *Aug. 14, 2012

(54) EMBEDDING INFORMATION IN DOCUMENT BORDER SPACE

(75) Inventors: Zhigang Fan, Webster, NY (US); Francis K Tse, Rochester, NY (US); Robert E Nuuja, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 936 days.

This patent is subject to a terminal disclaimer.

(21) Appl. No.: 12/276,024

(22) Filed: Nov. 21, 2008

(65) Prior Publication Data

US 2010/0128290 A1 May 27, 2010

(51) Int. Cl.
*G06K 9/00* (2006.01)

(52) U.S. Cl. .......................................................... 382/100

(58) Field of Classification Search .................. 382/100; 358/1.9

See application file for complete search history.

(56) References Cited

U.S. PATENT DOCUMENTS 6,694,042 B2 2/2004 Seder et al.
7,433,075 B2 * 10/2008 Tokunaga et al. .............. 358/1.9
2006/0061088 A1 3/2006 Harrington et al.
2006/0165255 A1 7/2006 Wang et al.

OTHER PUBLICATIONS

Fan et al., U.S. Appl. No. 12/276,034, filed simultaneously herewith, entitled "Prevention of Unauthorized Copying or Scanning".
Fan et al., U.S. Appl. No. 12/276,042, filed simultaneously herewith, entitled "Protecting Printed Items Intended for Public Exchange With Information Embedded in Blank Document Borders".
Fan et al., U.S. Appl. No. 11/751,665, filed May 22, 2007, entitled "Embedding Information in Document Blank Space".
Eschbach et al., U.S. Appl. No. 11/313,397, filed Dec. 21, 2005, entitled "Variable Differential Gloss Font Image Data".
Eschbach et al., U.S. Appl. No. 11/314,509, filed Dec. 21, 2005, entitled "Printed Visible Fonts With Attendant Background".
Zhigang Fan, U.S. Appl. No. 11/472,695, filed Jun. 22, 2006, entitled "Hierarchical Miniature Security Marks".
Zhigang Fan, U.S. Appl. No. 11/317,768, filed Dec. 23, 2005, entitled "Counterfeit Prevention Using Miniature Security Marks".
Fan et al., U.S. Appl. No. 11/582,813, filed Oct. 18, 2006, entitled "Security Marks Simulating Natural Defects for Embedding Information in Documents".

* cited by examiner

*Primary Examiner* — Tom Y Lu
(74) *Attorney, Agent, or Firm* — Philip E. Blair; Fleit Gibbons Gutman Bongini & Bianco P.L.

(57) ABSTRACT

A method for embedding coded information in a document border includes encoding information as a plurality of data carrying dot pair patterns where each dot is too small to be visually noticeable. For each page of a document to be rendered, the method includes determining whether the border area is blank. If found not blank the border area is cleared. Each of the plurality of data carrying dot patterns is embedded in the blank border area of the document page. The document page with the embedded data carrying dot patterns is then rendered, where each data carrying dot is too small to be visually noticeable.

30 Claims, 8 Drawing Sheets

EMBEDDING INFORMATION IN DOCUMENT BORDER SPACE

CROSS-REFERENCE TO RELATED APPLICATIONS

Cross-reference is made to the following applications filed concurrently herewith: U.S. patent application Ser. No. 12/276,034, entitled PREVENTION OF UNAUTHORIZED COPYING OR SCANNING, by Zhigang Fan; and, U.S. patent application Ser. No. 12/276,042, entitled PROTECTING PRINTED ITEMS INTENDED FOR PUBLIC EXCHANGE WITH INFORMATION EMBEDDED IN BLANK DOCUMENT BORDERS, by Zhigang Fan the disclosures of which are incorporated herein by reference in their entireties.

Cross-reference is made to the following co-pending applications, the disclosures of which are incorporated herein by reference in their entireties: U.S. application Ser. No. 11/751, 665, filed May 22, 2007, entitled EMBEDDING INFORMATION IN DOCUMENT BLANK SPACE, by Zhigang Fan; U.S. application Ser. No. 11/313,397, filed Dec. 21, 2005, entitled VARIABLE DIFFERENTIAL GLOSS FONT IMAGE DATA, by Reiner Eschbach; U.S. application Ser. No. 11/314,509, filed Dec. 21, 2005, entitled PRINTED VISIBLE FONTS WITH ATTENDANT BACKGROUND, by Reiner Eschbach; U.S. application Ser. No. 11/472,695, filed Jun. 22, 2006, entitled HIERARCHICAL MINIATURE SECURITY MARKS, by Zhigang Fan; U.S. application Ser. No. 11/317,768, filed Dec. 23, 2005, entitled COUNTERFEIT PREVENTION USING MINIATURE SECURITY MARKS, by Zhigang Fan; and, U.S. application Ser. No. 11/582,813, filed Oct. 18, 2006, entitled SECURITY MARKS SIMULATING NATURAL DEFECTS FOR EMBEDDING INFORMATION IN DOCUMENTS, by Zhigang Fan.

BACKGROUND AND SUMMARY

An exemplary embodiment relates to the digital imaging arts. It finds particular application in conjunction with a method and apparatus for incorporating watermarks comprising small marks in blank portions of pages of documents. The watermarks may be used for embedding information in hard copy document borders or periphery which may be used to distinguish authentic hardcopy documents from counterfeit documents or for other applications.

Since print systems have been in existence, printers have sought methods for inhibiting counterfeiting and unauthorized copying of printed documents. Machine readable information in the form of watermarks, barcodes, and the like have been embedded into images on paper for a variety of applications, including document identification and authenticity verification. The code is generally invisible or visually unobtrusive and may be decoded by a device which is capable of reading the information. Current counterfeit prevention systems are frequently based on the use of digital watermarks. Digital watermarking is a technique which allows a user to add information (e.g., copyright notices, security codes, identification data, etc.) to digital image signals and documents. Such data can be in a group of bits describing information pertaining to the signal or to the author of the signal (e.g., name, place, etc.). Most common watermarking methods for images work in spatial or frequency domains. However, such techniques, while suitable for digital documents, are often not sufficiently robust to allow detection of the marks in hardcopies, i.e., when the digital document is rendered in physical form.

Additionally, many existing techniques are designed for a particular type of images, for example continuous-tone pictures or text. It is often difficult to select one algorithm for embedding a watermark on a page to be printed if the image type of the page is unknown. Another challenge for the existing technology is simplicity. Many methods require very complex calculations, either in embedding or in detection, and quite often, in both. Yet another challenge is to provide an embedding method which can be applied to both color images and black and white images. Some existing methods rely on embedding information in the yellow separation. They cannot be used for black and white printing devices.

U.S. Pat. No. 6,694,042, entitled METHODS FOR DETERMINING CONTENTS OF MEDIA, by Seder et al., discloses printing documents and other objects with machine readable indicia, such as steganographic digital watermarks or barcodes, for enabling document management functions. The indicia can be added as part of the printing process, such as by printer driver software, by a Postscript engine in a printer. The indicia can encode data about the document, or can encode an identifier that references a database record containing such data. By showing the printed document to a computer device with a suitable optical input device (e.g., a webcam), an electronic version of the document can be recalled for editing, or other responsive action can be taken.

Published Application No. 20060165255, entitled EMBEDDING VARIABLE WATERMARK INFORMATION IN HALFTONE SCREENS, by Wang et al., discloses incorporating correlated stochastic screens, time stamps, text messages, logos and other variable data into printed halftone images in real-time as invisible watermarks.

Published Application No. 20060061088, entitled METHOD AND APPARATUS FOR INTERNET COUPON FRAUD DETERRENCE, by Harrington et al., discloses embedding anti-counterfeiting marks that carry user information and other data into an original coupon design. The marks may be invisible, or visible but difficult to remove. At the receiving side of the coupons, the embedded data are used to detect fraud and trace back the coupon users.

Above-mentioned U.S. application Ser. No. 11/317,768 discloses a system which applies a security mark to a recipient, such as an image or document. A data reception component receives information from one or more sources. A security mark generation component generates at least one miniature security mark (MSM) configuration based at least in part upon the information from the data reception component. An application component applies the at least one MSM configuration to one or more recipients.

All disclosure provided in the above cited references is hereby incorporated by reference in their entirety herein for their teaching.

There remains a need for alternative systems and methods to provide non-invasive watermarking techniques which may be used for identification of images and/or documents, for uses such as prevention of counterfeiting, and for other purposes.

Thus in accordance with one aspect of an exemplary embodiment, a method for embedding information in a document includes receiving a digital image data document page, and checking the border of that page at the edge to determine if the border is blank. If the border is determined as not blank it is cleared of data. After receiving information to be embedded, it is encoded as a plurality of data carrying dot pair patterns. The dot pair patterns comprise dots too small to be visually noticeable when rendered. The encoded plurality of data carrying dot pair patterns are embedded in the border area of the document digital image area. The document with the embedded data carrying dot patterns is rendered.

In another aspect, a system for embedding information in a document includes a data reception component that receives information. A watermark embedding component in communication with the reception component embeds a watermark in a document to be rendered based at least in part upon the received information. The watermark embedding component identifies a sequence of blank blocks in the cleared border of a document page to be rendered and embeds the information as a plurality of data carrying dot patterns, each of the dot patterns being embedded in a respective blank block. The system further comprises a rendering unit or printer for rendering the embedded document where each of data carrying dot patterns in the border is rendered with each dot too small to be visually noticeable.

In another aspect, a recipient includes an image and a machine readable watermark embedded therein, the watermark comprising a plurality of data carrying dot patterns which each encodes data, each dot pattern comprising an arrangement of miniature marks which are substantially unnoticeable to an unaided eye, the dot patterns being each assigned to a respective one of a sequence of equally sized blank blocks arranged along the border of the recipient which been previously cleared of any image data thereupon assigned, whereby by examination of blank blocks containing no more than a threshold amount of image data, the dot patterns which are otherwise indiscernible, are retrievable and the data encoded therein interpreted.

In another aspect, a method for retrieving information embedded in blank border space in a rendered document includes inputting image data acquired from the rendered document, partitioning at least a portion of a document page represented by the image data into a plurality of equally sized blocks arranged along the edge as a border, and identifying, from among the blocks, a sequence of blank blocks which contain no more than a threshold amount of image data. For each block in the sequence of blank blocks, the method includes determining whether the block includes a pattern of miniature marks which corresponds to a unique datum value stored in a data structure. The information embedded is retrieved from the unique data values.

In another aspect, a system for retrieving information embedded in a document includes a detection component for generating a signal representative of image data acquired from a document, a data structure which links each of a plurality of predefined dot patterns with a unique datum value, and an extraction component for extracting a watermark from the image data, where present. The watermark includes a plurality of the dot patterns. The extraction component is configured for partitioning at least a portion of a document page border represented by the image data into a plurality of equally sized blocks, identifying, from among the blocks, a sequence of blank blocks which contain no more than a threshold amount of image data, for each of the sequence of blank blocks, determining whether the block includes a dot pattern otherwise too small to be visually noticeable and which corresponds to a unique datum value stored in the data structure. From the unique data values, the information embedded is retrieved. The system optionally includes an implementation component for implementing a computer implemented process in accordance with the retrieved information.

DESCRIPTION

Most pages of a document, whether they are pictorial images, text, or a combination of text and pictorial images, contain blank space particularly in the borders. In embodiments disclosed herein, information is embedded in the blank border space of printed pages using patterns comprising miniature marks, such as dots. The dots may be very sparse and very small, such that they are not perceptible under normal visual inspection. The information can be subsequently retrieved using techniques for detecting the embedded patterns.

The exemplary systems and methods for embedding and the detection processes are very simple, compared to most existing methods. As the dots can be printed by any color, the method can be applied to both color and black and white printing devices. In addition, the proposed method also has the advantage of its modularity. Specifically, the patterns to be embedded can be coded in an image block and can be implemented as a "font."

The word "printer" as used herein encompasses any apparatus, such as a digital copier, bookmaking machine, facsimile machine, multi-function machine, etc. which performs a print outputting function for any purpose. An image generally may include information in electronic form which is to be rendered on a recipient by the printer and may include text, graphics, pictures, and the like.

Figure 1:
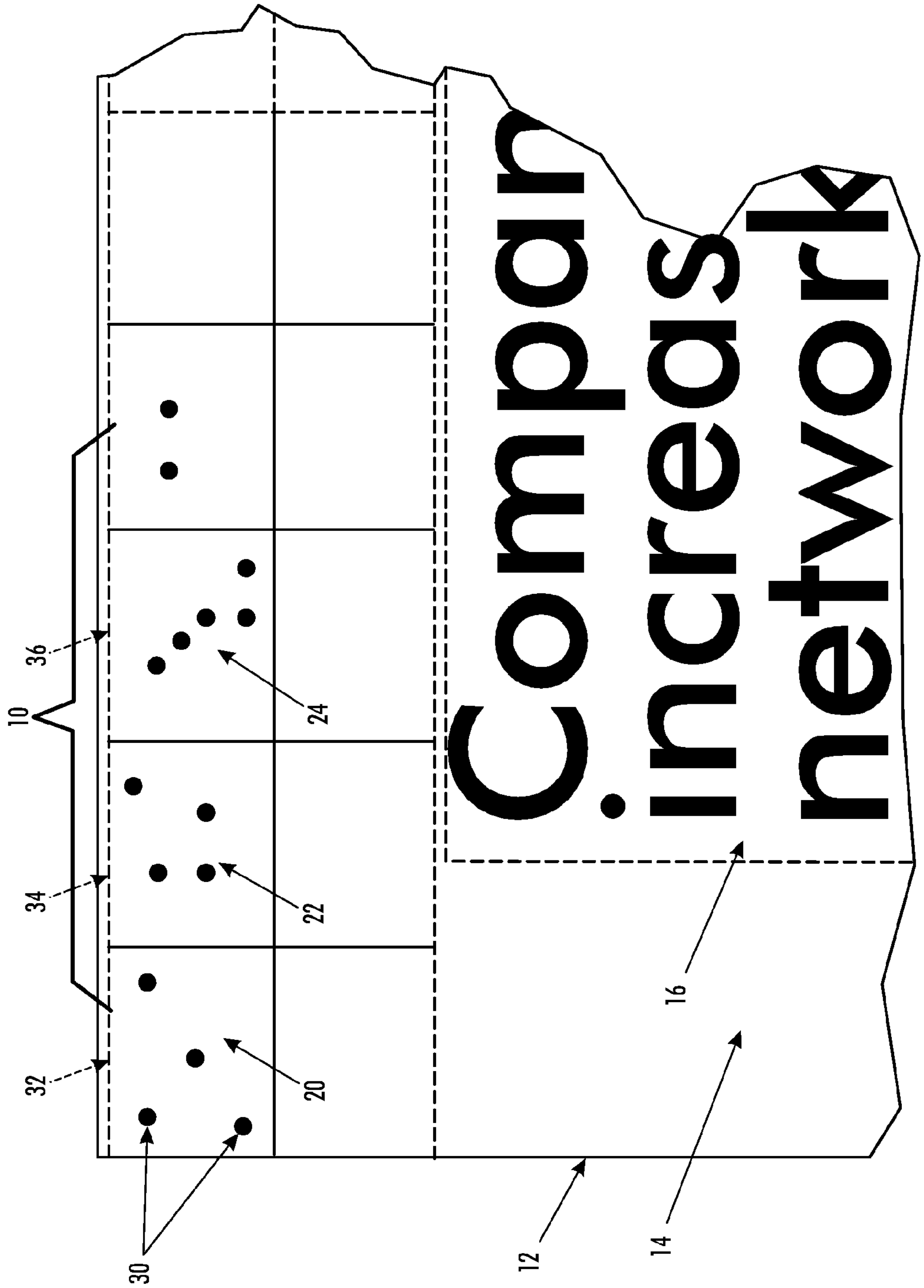
FIG. 1 illustrates an exemplary watermark applied to a page of a hardcopy document with in accordance with one aspect of the exemplary embodiment.

FIG. 1 illustrates an exemplary watermark 10 applied to a recipient 12. The recipient 12 can be substantially any media or surface to which a watermark can be applied, such as paper, velum, acetate, etc. The recipient 12 can be in the form of a page of a hardcopy document. The watermark is applied to the blank space 14 of the recipient 12. By "blank space," it is meant that portion of the page 12 which is designated to be empty of applied marks which constitute the visible content of the document. For example, the blank space of a page typically forms a margin or border on four sides of the page (top, bottom, and left and right sides). The page may include one or more images 16, such as a picture, drawing, and/or block of text, around which the blank space 14 is arranged.

The marks forming the image(s) 16 and watermark 10 may be applied in the same rendering process, e.g., by printing.

The watermark 10 includes a plurality of dot patterns 20, 22, 24, etc. Each dot pattern includes an arrangement of miniature marks 30, such as dots, which for ease of representation, are not drawn to scale in FIG. 1. The dot patterns may be formed by any suitable method, such as depression, impression, raised, overlay, etc. that is can be applied to a recipient, such as an electronic document or hard copy document. In the case of a printed document, for example, the marks may be formed with colorants, such as inks or toners. The watermark 10 comprises a predetermined sequence of dot patterns which encode information that can be detected, extracted and/or interpreted. The information can be used for a variety of purposes, including conveying information about the recipient, such as its origin or the content of the images printed thereon, verifying authenticity of a product embodied in the recipient (e.g., a passport or banknote), and/or for automatically causing implementation of a computer implemented process, such as denying copying of the document, alerting a user that copying is not permitted, denying access to the document, retrieving information related to the document, or the like.

Each individual mark 30 will be too small to be visually noticeable to the unaided eye, although the marks may be detectable with a careful scrutiny of the page. In particular, each mark 30 may be no more than a few pixels in diameter (or average dimension), e.g., from 1-5 pixels in diameter. For example, each dot may be 1×1 pixels for a 300 dots per inch (dpi) printing system, which corresponds to about 85 micrometers in diameter. In general, a pixel is the smallest mark which can be individually printed. Each of the marks in a pattern may thus be small in size (e.g., a size between about 1 micrometer and several hundred micrometers, such as about 50 to 500 micrometers in diameter) such that they are virtually invisible to the naked eye. While the marks are illustrated as circular dots, it is to be appreciated that the marks may each be any other suitable shape, such as a square, triangle, irregular shape or the like which is capable of detection. For example, a mark may be 2×2 pixels, 3×3 pixels, or 4×4 pixels, or the like, in dimensions. In one embodiment, all the marks in the watermark 10 are the same size and shape. Each mark 30 is spaced from its nearest neighbor such that it may be distinguished therefrom when detected. Depending on the accuracy of the detection system, the marks may be spaced from their nearest neighbors by at least one pixel width, and in general, by a distance of at least 3 pixels or at least 5 pixels. In this way, the marks' approximate locations, rather than specific locations, can be used to determine a dot pattern in a rendered document. This allows compensation for a slight mis-registration of the blocks during the detection phase. Information can be conveyed by the arrangement of dots which make up a dot pattern. Each different dot pattern can convey different information.

Each dot pattern 20, 22, 24 in the watermark generally includes at least one mark 30. Although one dot pattern could be a pattern with no marks, in general, accuracy and data carrying capacity is improved by requiring that each dot pattern includes a plurality of marks. In general, some or all of the dot patterns 20, 22, 24 may include at least two discrete marks 30. In one embodiment, each of a plurality of dot patterns in the watermark includes m marks, where m can be, for example, from about 0-6, e.g., 2-6. In some cases, all dot patterns in the watermark may contain the same number m of dots. In other embodiments, each dot pattern may contain no more than a maximum M of dots.

Each dot pattern 20, 22, 24 is confined within a respective imaginary block 32, 34, 36, etc. The blocks 32, 34, 36 of all the patterns in the watermark 10 may be of the same size. For example, the block size may be from about 10 to about 400 pixels in each dimension, e.g., 256×256 (pixels) for 300 dpi printing. In general, blocks may be less than about 5 cm in size, e.g., about 0.5 cm-3 cm in each dimension. The size of the block may be selected such that the page may be subdivided into equally sized blocks. In general, no block 32, 34, 36 overlaps any other block. The blocks may form part of regular array which encompasses the entire page 12, or the majority thereof, such that blocks are arranged in mutually perpendicular directions. The blocks may be rectangular or may assume other shapes, such as other regular polygons, e.g., triangles, hexagons, trapezoids, or the like, which can fit together to form an array of blocks, which may be arranged in rows and columns in two directions.

Each block 32, 34, 36 that is located in the blank space 14 of the page may contain up to one dot pattern, i.e., be blank or contain a dot pattern.

Figure 2:
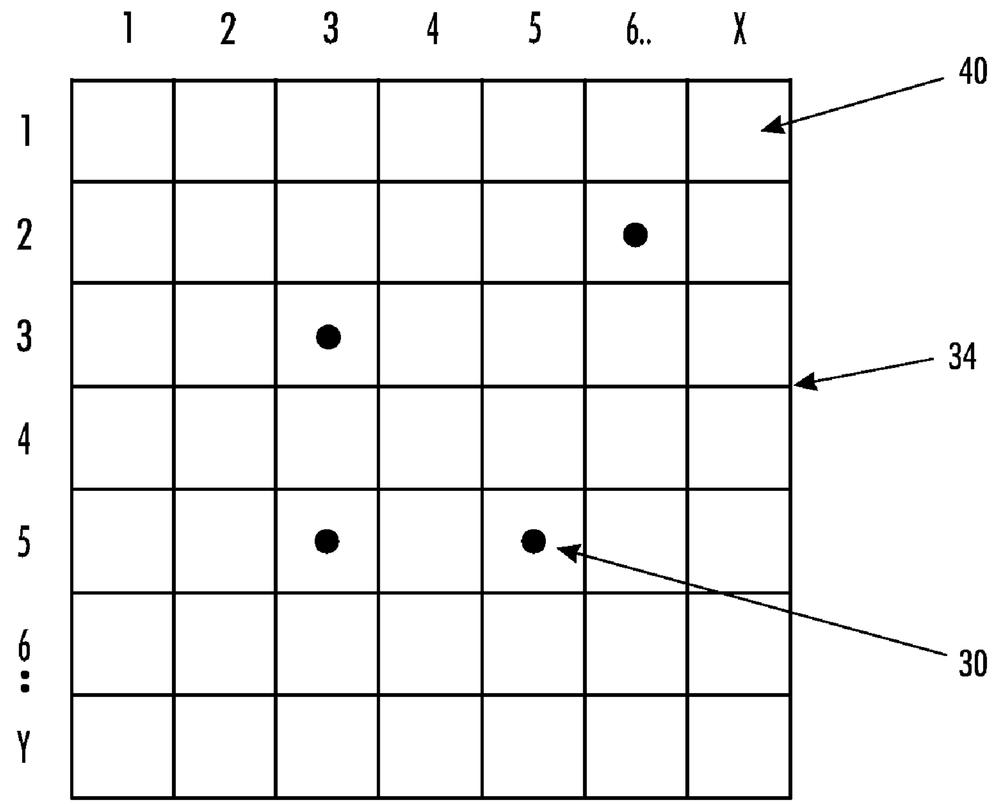
FIG. 2 illustrates a portion of a digital watermark as a block divided into cells.

As illustrated in FIG. 2, to provide fixed locations for the marks, each block 32, 34, 36, etc. is subdivided into a plurality of N imaginary cells 40, arranged in a regular two-dimensional array of rows and columns, such as an XxY array of cells, where X and Y may independently be from about 3 to about 20, i.e., N may be from 9 to 400, such as from 16 to 144. In one embodiment (not shown), each row of cells in the two-dimensional array may be offset from the next row to accommodate a selected screen angle in halftone printing. In general, each cell 40 is substantially larger than the size of a dot 30, such that a dot placed within a cell is surrounded by at least a pixel-wide ring of empty pixels. While the minimum size of such a cell may be 3×3 pixels, to allow for ease of detection, for 300 dpi printing, each cell may be at least 4 pixels in each dimension, such as at least 6×6 pixels or 8×8 pixels. As will be appreciated, for higher print resolutions than 300 dpi, such as 600 or 1000 dpi, the cells may each occupy correspondingly greater numbers of pixels. Each cell can contain up to one dot 30, i.e., either no dots or one dot. In general, the dot is positioned in a predetermined location in the cell, such as at the geometric center of the cell, such that dots in adjacent cells 40 are not contiguous. This allows for some small shifting of dot positions during printing of the document to be accommodated in the retrieval process. The size of the cell relative to the size of the dot provides a significant degree of tolerance for the determination of the dot's location in the detection step. For example, for a dot 1×1 pixels in size and a cell 32×32 pixels in size, the tolerance permits the dot to be detected as being in the cell even if it moves by up to about ±15 pixels in each direction.

The number of possible dot patterns can be readily determined. If m cells 40 are selected to be active, for any block there are:

$$C(m)=N!/[(N-m)!m!]$$

possible patterns. If m is chosen to be $0<m<M$, where M is the maximum number of marks which a data carrying dot pattern may comprise, the total number of patterns for the block is $C=[\Sigma_{0<m<M}C(m)]$. There are tradeoffs in selection of M and the cell size. A smaller M means less dots per block and thus the watermark is less visible, but it also means less information capacity. A smaller cell size implies greater N and thus more information capacity. However, it is less robust to registration error.

From C patterns, $B^2$ patterns may be selected to be used for embedding information, where B=floor[x], and where floor [x] specifies the integer part of a non-negative number x, where $x=\log_2 C$. For each of these $B^2$ patterns, a B-bit binary code is assigned. Data structures may be established, such as lookup tables (LUTs) in which the information to be encoded and corresponding pattern(s) are linked, so that a pattern can be searched from its code, or vice versa.

One or more of the blocks 32, such as at least two of the blank blocks, may be designated as a registration block. The registration blocks may be located at the corners of the page or other readily detectable location. As will be appreciated, if image data, such as a page number, is located in the corner, this location is generally not used for registration. Selected ones of the dot patterns may be assigned to the registration blocks. A look up table (LUT) or other data structure for linking dot patterns with corresponding data, may also include information on the registration patterns. The registration blocks may provide registration information for registering the remaining blocks during detection. The registration blocks allow the locations of the other blocks in the array to be identified by compensating for changes in magnification, translation and/or rotation (skew) of the image during the rendering process. The rest of the blocks 34, 36, etc. may be data carrying blocks, which encode the data (information) being embedded.

For example, in one exemplary embodiment, for 300 dpi printing, each 256×256 pixel block 32 may contain 64 cells 40, each of which is 32×32 pixels. In the case of m=2 (two dots per dot pattern), each block can have any one of 2080 unique dot patterns. Each block can therefore carry 11 bits of information. For a page which has sufficient blank space for a total of 108 blocks, 4 blocks may be allocated as registration blocks. Thus for example, when 1012 bits of information are to be conveyed, there may be 12 data carrying blocks and 92 blank data blocks.

As will be appreciated, each page 12 to be embedded with information may have a different amount of blank space 14 and the blank space may be located in different regions of the page, depending on the image(s) to be applied to the page. Accordingly, the same information may be embedded in different pages with a different layout of the data blocks. In some cases, information may be split between pages where insufficient blank space exists on one page.

Figure 3:
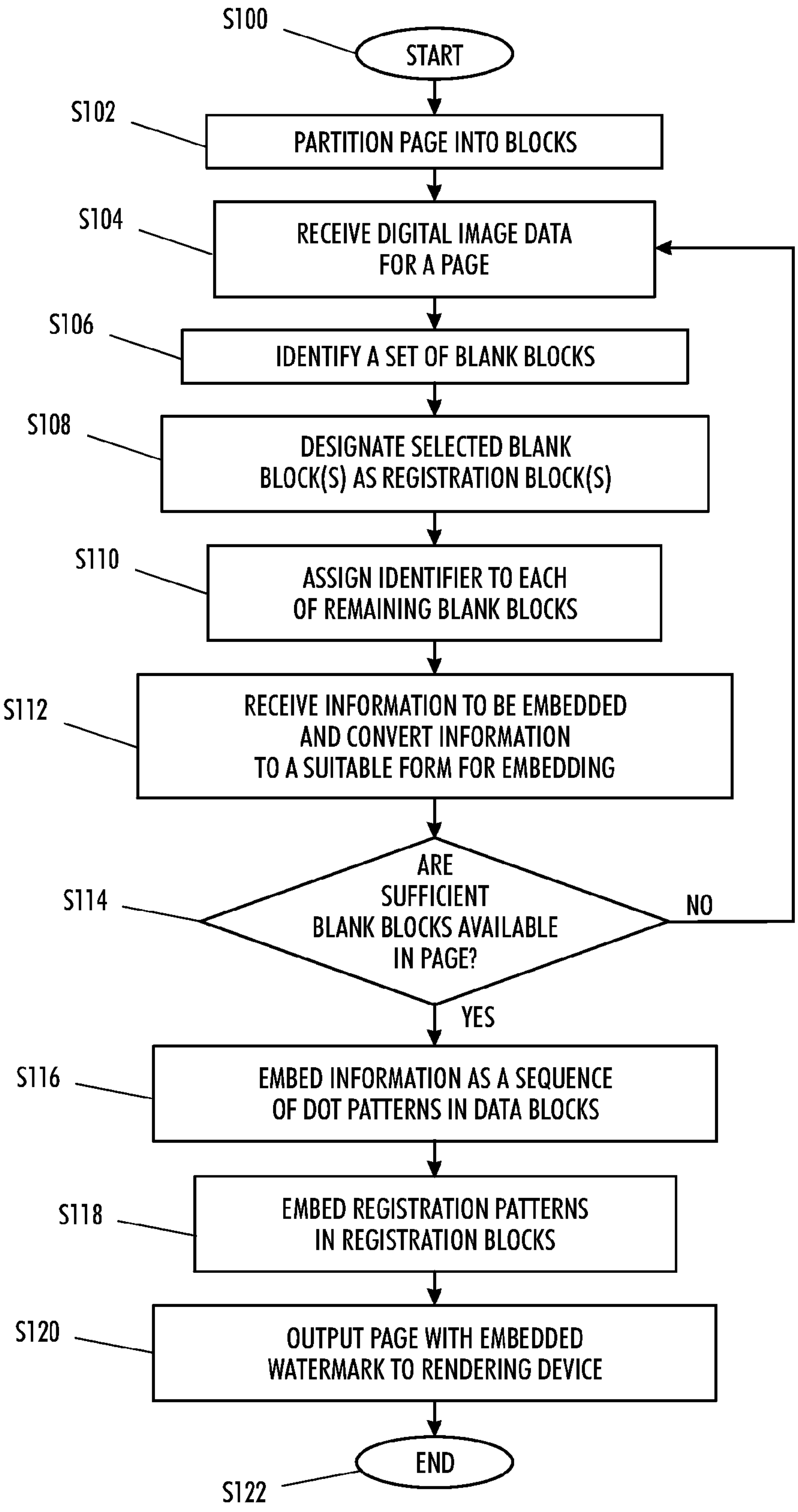
FIG. 3 is a flow diagram of an exemplary method for embedding a watermark in accordance with another aspect of the exemplary embodiment.

With reference to FIG. 3, a method for embedding information in the form of a watermark 10 into a document 12, such as that illustrated in FIGS. 1 and 2, is illustrated. The method begins at S100.

Figure 4:
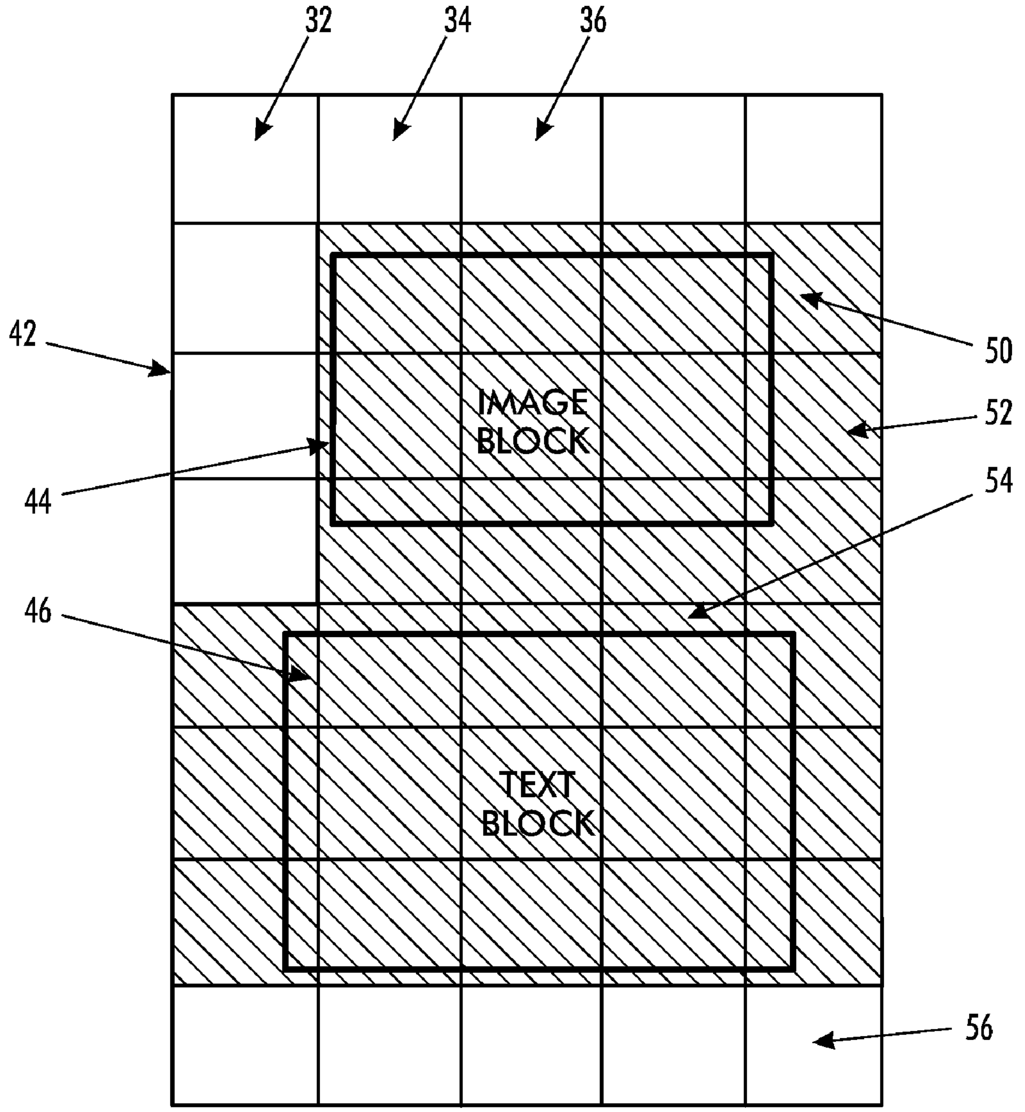
FIG. 4 illustrates the identification of blank blocks among a regular grid of blocks for a page of a digital document which includes image data.

At S102, design parameters for the system are determined. Specifically, for each page size to be supported, the entire page, or a selected portion thereof, is partitioned into a regular two dimensional array of blocks 32, 34, 36, etc. which may all be of equal size and shape, and arranged in equally spaced rows and columns, as illustrated in FIG. 4. The page size for a document may correspond to, for example, one or more of letter size, legal, A3, A4, and the like. The blocks 32, 34, 36 may have a width and length of from about 0.5 to about 3 cm. Optionally, the array of blocks may be inset from the edge of the page to allow a narrow strip around the edge of the page to allow for substrate registration errors. As illustrated in FIG. 2, each block is further divided into small (typically square) cells 40. The parameters of the partitioned page may be stored as a template to be applied to a digital document page 42 in which information is to be embedded. For example, x,y coordinates are stored for the blocks and cells.

At S104, digital data corresponding to a page 42 of a document to be printed is received. The digital data may be received in any suitable format, such as a page description language (PDL) format, from any suitable source of digital data.

At S106, blank blocks in page 42 are identified. These are blocks for which no image data is assigned, such as blocks 32, 34, 36. Other blocks, which contain at least some assigned image data 44, 46, such as blocks 50, 52, 54, are not blank, and are therefore ignored. For example, the partitioned template is applied to the document page 42 and each block in the document page is examined in sequence in a predetermined order (e.g., from top to bottom and from left to right) to see if the block is blank. For purposes of the embedding process, a block is considered "blank" if and only if all the pixels within the block are white (off).

At S108, one or more of the identified blank blocks may be designated as a registration block 32, 56.

At S110, the remainder of the blank blocks, i.e., the potential data carrying blocks (k data blocks) 34, 36, etc. are assigned a unique identifier. In the exemplary embodiment, they are numbered sequentially and the number of blank blocks available is counted.

At S112, information to be embedded is received from any suitable source of information. If not already in binary form, the information may be converted into a suitable form for processing, such as binary code, and concatenated as a string.

At S114, an evaluation may be made to determine whether sufficient blank blocks exist for embedding the information. For example, if either the total number of total blank registration blocks 32 in the page is less than Tr, or the number of data blocks is less than Tb, where Tr is a predetermined threshold (e.g., 2 or 4) and $$Tb = \frac{\text{number of bits of data to be embedded}}{B}$$

where B is the number of bits which can be embedded per block, the embedding process may be discontinued (or the method returns to S104 for the next document page). Otherwise, the process continues to step S116.

At S116, in the embedding step, information to be embedded is converted to a sequence of dot patterns, each dot pattern encoding a portion of the information to be embedded. In particular, the message to be embedded is divided into B-bit segments, each segment being assigned to a blank data block in a sequential manner (i.e., the i-th segment is assigned to the i-th blank data block). For each data segment, the associated pattern can be found from the LUT. The respective pattern 20, 22, etc. is then embedded into the block. Specifically, the pattern specifies which cells should be turned "on" in the block. For an "on" cell 40, the center pixel (or a small group of pixels in the center of the cell 40) is turned from white to black (in the case of black and white machines) or other non-white color(s) (for color machines).

At S118, for each of the blocks designated as registration blocks 32, 56, a pattern is assigned. For each blank registration block, the pre-determined pattern for the registration block is embedded. The patterns for the registration blocks may be designed such that they are not symmetric over 180 degree rotation. By doing so, the paper orientation can be easily determined during detection.

At S120, the digital document in which the watermark has been embedded may be output to a rendering device, such as a printer or display for rendering on a recipient. The method ends at S122.

Each dot pattern to be embedded as a block can be cast as a "font." The above embedding process can thus be implemented as writing "characters" to specific locations in the page.

The method illustrated in FIG. 3 may be implemented in a computer program product that may be executed on a computer. The computer program product may be a tangible computer-readable recording medium on which a control program is recorded, such as a disk, hard drive, or may be a transmittable carrier wave in which the control program is embodied as a data signal. Common forms of computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, transmission media, such as acoustic or light waves, such as those generated during radio wave and infrared data communications, and the like, or any other medium from which a computer can read and use.

Figure 5:
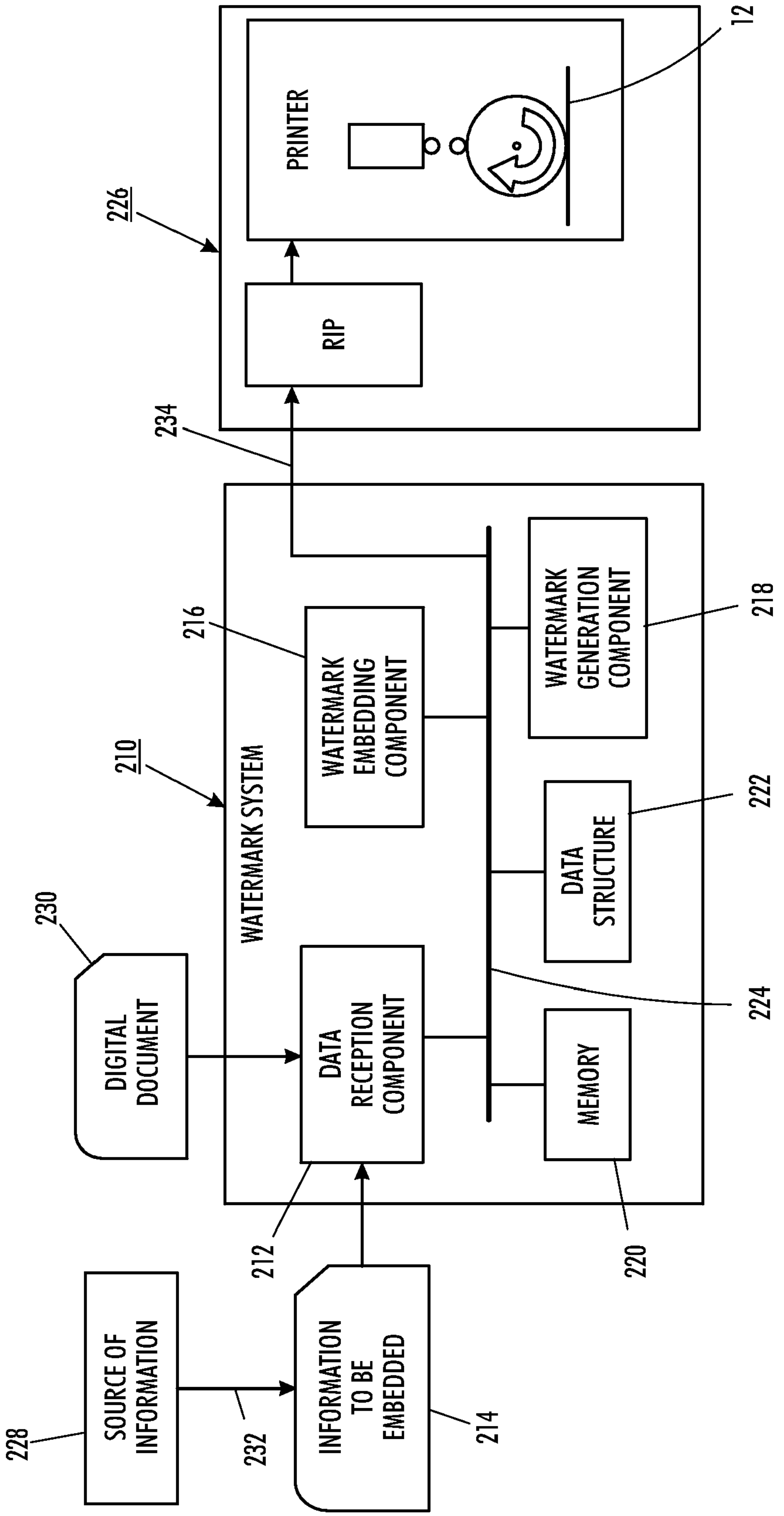
FIG. 5 illustrates an environment in which a watermarking system operates.

With reference to FIG. 5, an environment in which a watermarking system 210 operates is illustrated. The system 210 generates and applies dot patterns for embedding information in one or more recipients in accordance with the method illustrated in FIG. 3. The system 210 may be hosted by a suitable host processing device. The system 210 may comprise a single processing component, or be distributed across one or more processing components in one or more locations, e.g., on a client and server. The system 210 includes a data reception component 212, which receives input information 214 to be embedded, a watermark generation component 216, which executes instructions for generating a watermark based on the received information 214, a watermark embedding component 218, which executes instructions for embedding the watermark in a digital document, a memory component 220, which stores the processing instructions, and a data structure 222, which links dot patterns with information to be embedded, all interconnected by a data/control bus 224. The system 210 is in communication with an application component 226.

The data reception component 214 receives information from one or more sources of information 228. Such sources can be one or more databases, processing components, servers, workstations, scanning devices, memory storage devices, or the like which supply information in digital form. The system 210 also receives a digital document 230 in which the information 214 is to be embedded. Document 230 may be received from source 228 or another source.

Data 214 to be embedded can be representative of substantially any desired quantity such as origin of manufacture, date, time, serial number or simply an arbitrary alphanumeric string.

The watermark generating component 216 communicates with the data reception component 212 and can convert received data into watermark comprising a plurality of patterns which are assigned to blank blocks of a page of the digital document 230 in which the information represented by the dot patterns is to be embedded. The generated watermark is embedded in the digital document by the watermark embedding component 218.

It will be appreciated that two or more of the system components 212, 216, 218, 220, 222 may be combined or distributed as two or more separate components. For example, memory 220 may be combined with data reception component 212 and watermark generation and embedding components 216, 218 as a single chip. The host processor in which the system 210 is embodied may be a general purpose computing device, such as a desktop, laptop, or the like or may form a part of a dedicated device, such as a printer, copier, or multifunction device, which includes the application component 226.

The memory 220 can store instructions to be executed by the other components of the system 210 for performing the method of FIG. 3. Memory 220 may comprise any known type of data storage and/or transmission media, including magnetic media, optical media, random access memory (RAM), read-only memory (ROM), a data cache, a data object, etc. Moreover, memory 220 may reside at a single physical location, comprising one or more types of data storage, or be distributed across a plurality of physical systems in various forms.

The data structure 222 can be in any suitable format for associating a unique datum value with each of the dot patterns in the set of patterns, and which can be accessed for retrieving the pattern for an input datum value or vice versa. The data structure may include a simple look up table (LUT), search tree, or abstract dictionary. Data structure 222 may be stored in memory 220 or in a separate memory. The data structure may store at least 100 different dot patterns, each corresponding to a unique datum value. In one embodiment, the number of unique dot patterns stored may be at least 1000, or at least 2000.

The source of information 228, host processor 212, and application component 224 may be interconnected by links 232, 234, for communication therebetween. Suitable links include one or more of wired and wireless links, internet or intranet connections, or the like.

The application component 226 is in communication with the system 210 and receives a digital document in which a watermark has been embedded. The application component renders the watermarked digital document on a recipient, such as print media. As will be appreciated, this may include raster image processing (RIPing) the digital document whereby the image content, now including the watermark, is converted to a format in which the image content can be rendered on the recipient 12.

The application component 226 can be any suitable device for marking a print medium, such as a xerographic printer, inkjet printer, bubble jet printer, or the like using appropriate colorants, such as toners or liquid or solid inks. The printer can be a stand-alone printer or a component of a multifunction device which may include printing, scanning, copying, and/or faxing capability. In a typical xerographic printer, for example, a photoconductive insulating member is charged to a uniform potential and thereafter exposed to a light image of an original document to be reproduced. The exposure discharges the photoconductive insulating surface in exposed or background areas and creates an electrostatic latent image on the member, which corresponds to the image areas contained within the document. Subsequently, the electrostatic latent image on the photoconductive insulating surface is made visible by developing the image with a developing material. Generally, the developing material comprises toner particles adhering triboelectrically to carrier granules. The developed image is subsequently transferred to a print medium, such as a sheet of paper, and fused thereto by applying heat to the toner with a heated roller and application of pressure.

While particular reference is made herein to applying a watermark to a physical embodiment of a recipient 12, it is to be appreciated that the watermark applying component may apply the security mark to a digital image by embedding the watermark as data in the image data. For example, the image data can be transformed by changing gray levels corresponding to colorant values of pixels of the image.

Figure 6:
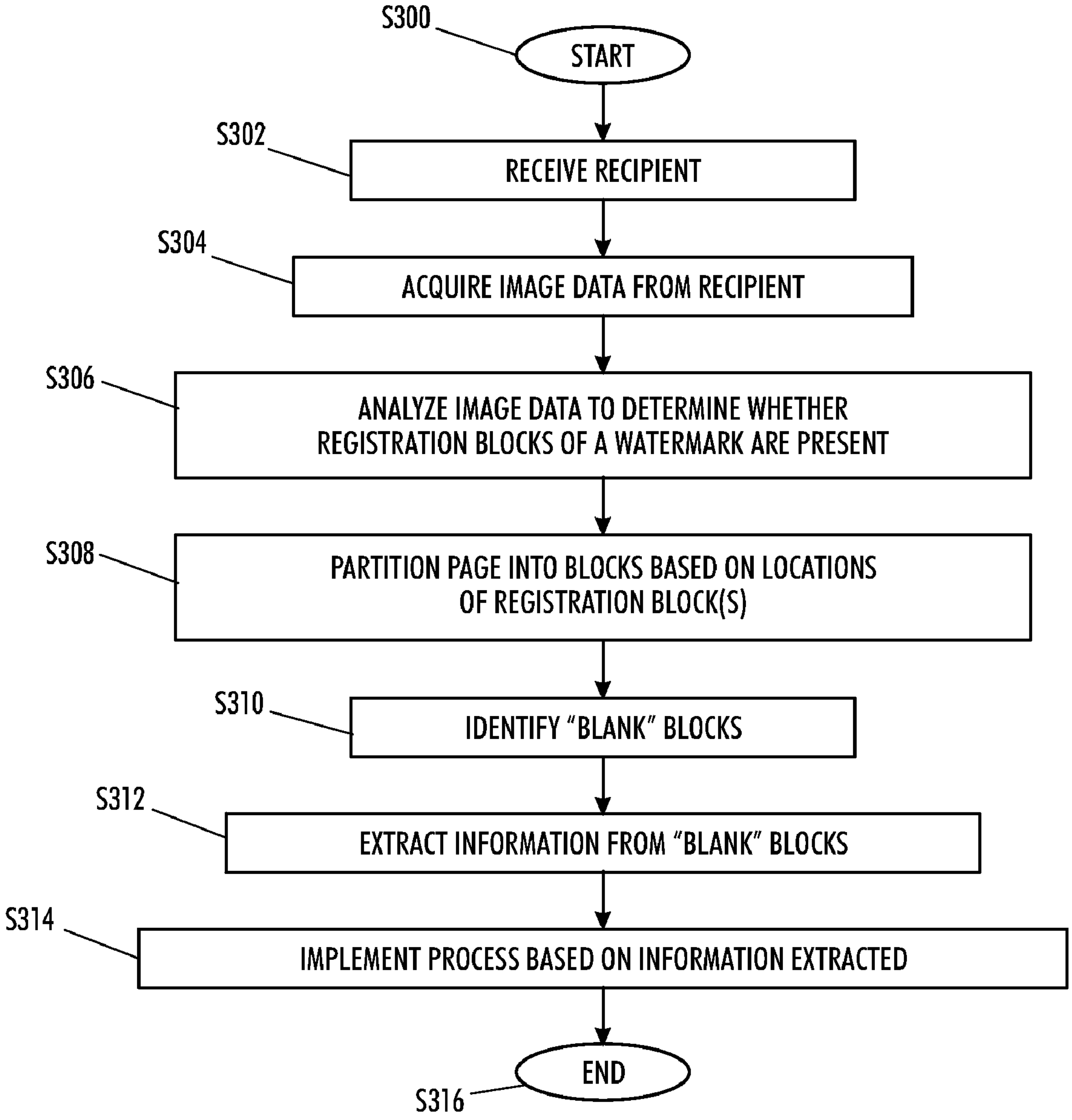
FIG. 6 is a flow diagram of an exemplary method for extracting and interpreting a watermark which has been embedded in a hardcopy document in accordance with the method of FIG. 3.

With reference to FIG. 6, an exemplary method for information retrieval from a recipient, such as recipient 12 or a recipient without a watermark, is illustrated. As will be appreciated, the methods may include fewer, more, or different steps from those illustrated. The retrieval method may occur at some time subsequent to the exemplary embedding method described above.

The method begins at S300. At S302, a recipient which may or may not comprise a watermark is received.

At S304, image data is acquired from the recipient. For example, the recipient may be scanned.

At S306, the acquired image data may be processed to determine if a watermark is present. This may include identifying whether registration blocks are present. If no registration blocks are detected, the method may end at this stage.

At S308, the registration blocks, where present, may be used to register the locations of other blocks.

At S310, the other blocks are examined to identify blank blocks.

At S312, the information contained in the data blocks of the watermark is extracted. This may include matching patterns of marks in the registered data blocks with those stored in the data structure.

At S314 a process may be implemented automatically, based at least in part on the extracted information. This step may include interpreting the information and optionally combining the information with other information acquired from the recipient, such as its shape, color, weight, other markings, or the like.

The method ends at S316. Further details of these steps will now be provided.

As noted above, when a page with embedded information is scanned (S304), the registration information is first retrieved (S306). In this step, the page boundary provides crude alignment information, from which, a rough estimation of the locations of the registration blocks 32, where present, can be obtained. One or more of these areas are searched to determine whether any registration pattern(s) are present. If a match is found, at S308, the relative shift (the difference between the orthographical position and the actual position) for the registration block is determined. The relative shifts for different blocks are interpolated/extrapolated so that the relative shift for every part of the page can be estimated. In particular, the boundary for each data block is adjusted to reflect the relative shifts.

Then, a sequential check of each data block 34, 36 in the page is made to determine whether the block is blank. In the information retrieval phase, a block is considered to be blank if its number of non-white pixels is smaller than a pre-determined threshold (S310). The threshold may be selected to eliminate most if not all of the image content blocks while providing a high probability that actual data-carrying blocks are classified as blank. The non-blank blocks are skipped from further testing. For each blank block, at S312, all cells within the block are examined to see if they are "on". One method for determining if a cell is "on" is to see if its darkest pixel is darker than a threshold. As will be appreciated, in the embedding stage, each dot may have been formed by making each pixel in the pattern the same gray level (e.g. black). However, during the process of rendering the pattern on the recipient and/or capturing an image of the recipient, this binary structure may be lost, i.e., the pattern becomes blurred. Accordingly, the threshold may be set such that for each pixel which was "on" in the embedding stage, there is a high probability that a pixel within the corresponding cell of the acquired image will be darker than the threshold and thus determined to be "on."

From the dot pattern (as determined by which cells are "on") obtained for the block, the associated code can be retrieved from the data structure 222. The codes from different blank data blocks are concatenated to form the retrieved message.

The method illustrated in FIG. 6 may be implemented in a computer program product that may be executed on a computer, as described previously for the method of FIG. 3.

Figure 7:
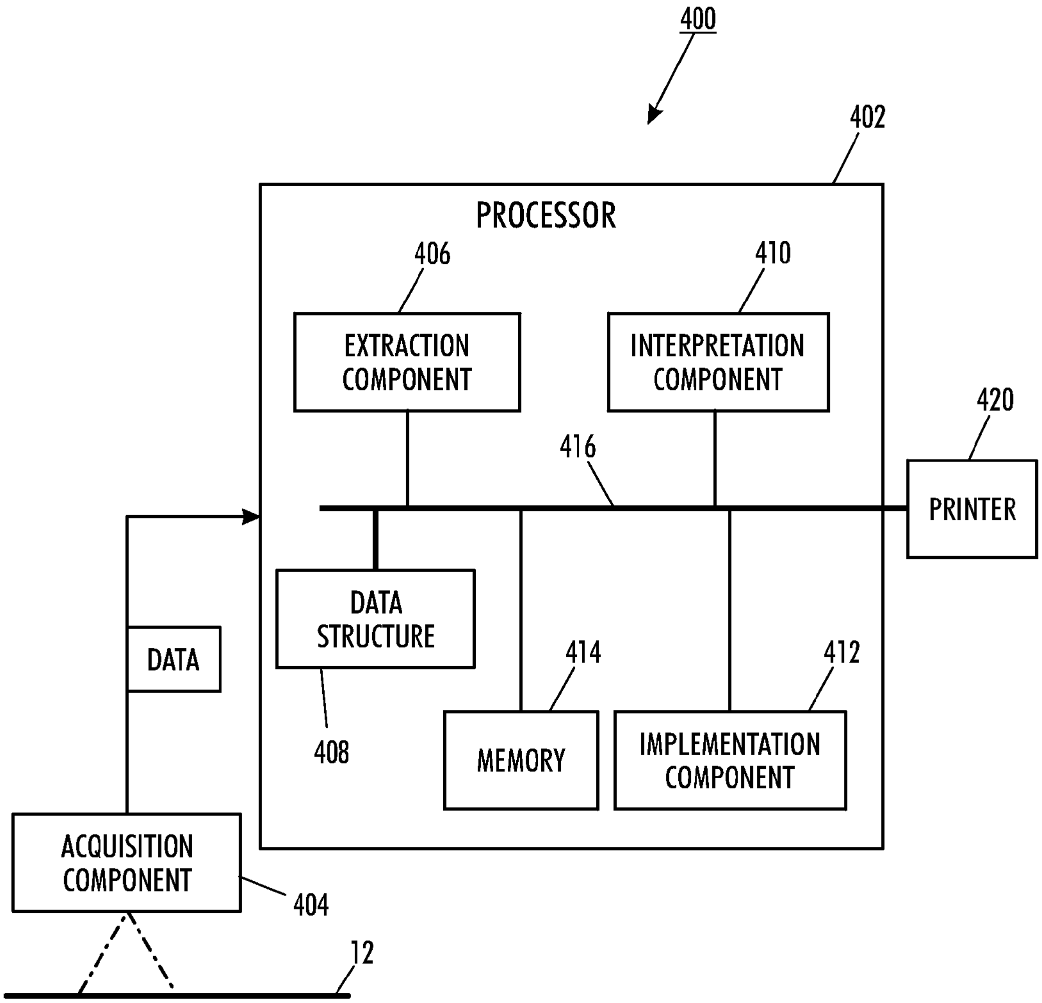
FIG. 7 is a functional block diagram of a system for extracting and interpreting a watermark which has been embedded in a hardcopy document.

FIG. 7 illustrates an exemplary system 400 that interprets a watermark. In general, the system includes components for implementing the method described above with reference to FIG. 6. Accordingly, the components need only be briefly described. The system includes a processor 402, which hosts various components for extracting a watermark, where present, interpreting the watermark, and optionally automatically implementing a process based on the interpretation. The processor receives data acquired from a recipient from an acquisition component 404. The processor 402 may include an extraction component 406, a data structure 408, an interpretation component 410, optionally an implementation component 412, and memory 414, all interconnected by a data control bus 416. The processor 402 may further be linked with an implementation device 420, such as a printer, which implements a computer implemented process, under the control of the host processor 402.

The acquisition component 404 may be a scanner which acquires image data from the recipient. In particular, a page of a document having one or more printed pages is processed by the scanner 404 to derive digital image data that represent the printed page in terms of a plurality of pixels arranged in rows and columns.

The host processor 402 may be a general purpose computing device which executes instructions stored in associated memory 414, similar to that described for system 210.

The extraction component 406 can be employed to detect one or more watermarks in the scanned image data. The extraction component 406 searches for registration blocks, registers, the remaining blocks, and extracts any dot patterns from the blank blocks. The interpretation component 410 compares these to the patterns stored in the data structure 408. The extraction and interpretation components can employ one or more algorithms to identify registration blocks and blank blocks, and extract information encoded as dot patterns within the blank blocks.

The data structure 408 may be similarly configured to data structure 222 of the embedding component.

The implementation component 412 may determine whether to implement a computer implemented process based in whole or in part on the information extracted from the embedded watermark. The implemented process may include displaying information extracted from the watermark, storing the information, outputting the information to an implementation device 420, allowing or denying printing of the recipient, or any other computer implemented process.

The above described teachings can be further arranged so as to lend themselves to access-controlled sites, as will be herein below be further described. In access controlled sites there are disseminated documents which are not allowed off-site and for which it is thereby desirable for any copier/scanner located on-site to refuse to copy/scan, or in the alternative copy/scan such documents only at very low or distorted resolution. Such a secured scanning feature is vital for organizations that handle sensitive documents, particularly for ultra high security sites where no paper documents can leave the site. This may be achieved by utilizing the above taught methodologies during printing of the sensitive documents. Additional information is inserted to the sensitive documents to label them so as to flag to any on site scanner or copier machine that they are not to be scanned, nor are they to be copied. The amount of additional information needed to provide such indicia of "no-scan" or "no-copy" is small. When such a machine readable "no-scan" label is detected during copying/scanning operation, appropriate actions, such as stopping the operation or alerting the security will be taken.

However, the above techniques may prove awkward or even fail in those cases where the document to be protected does not contain enough genuine blank space. More importantly in such an arrangement there is less tolerance for any computational overhead burden. This burden, while also impacting the encoding phase, is particularly undesirable in the decoding phase where it would adversely impact the scanning/copying time of every document, not just those which actually have "no-scan" labels.

This may be achieved by embedding the invisible "no-scan" information at the border of the pages. The system consists of an embedding sub-system, which resides in printers or printing systems, and a detection sub-system, which is integrated in scanners and copiers. During printing, a user may activate the embedding sub-system through a GUI and insert the "no-scan" information into the document to be protected. The embedding procedure contains two steps: first, the page border is cleared to make it blank in the event it should happen to contain document content; and second, the "no-scan" information is then coded as small dots, which are not perceptible under normal visual inspection, and embedded into the cleared page border. The detection sub-system monitors all scanned pages to see if they carry "no-scan" labels. It first locates the page boundaries and then checks if the page border areas are essentially blank. For blank page borders, further examination is performed to determine if they contain the "no-scan" information. An alert signal is sent out if the detection result is positive.

Such a method can be applied to protect any kind of document, no matter if it comprises pictures, graphics, or text, and regardless of if it contains blank space or not. Further, it matters not if the printer is color, or black and white. The embedded signal is imperceptible and no visible interference with the original document is introduced. Both embedding and detection processes are much simpler compared to most existing technologies and the methodologies above for finding blank space central to, or inside a page.

Figure 8:
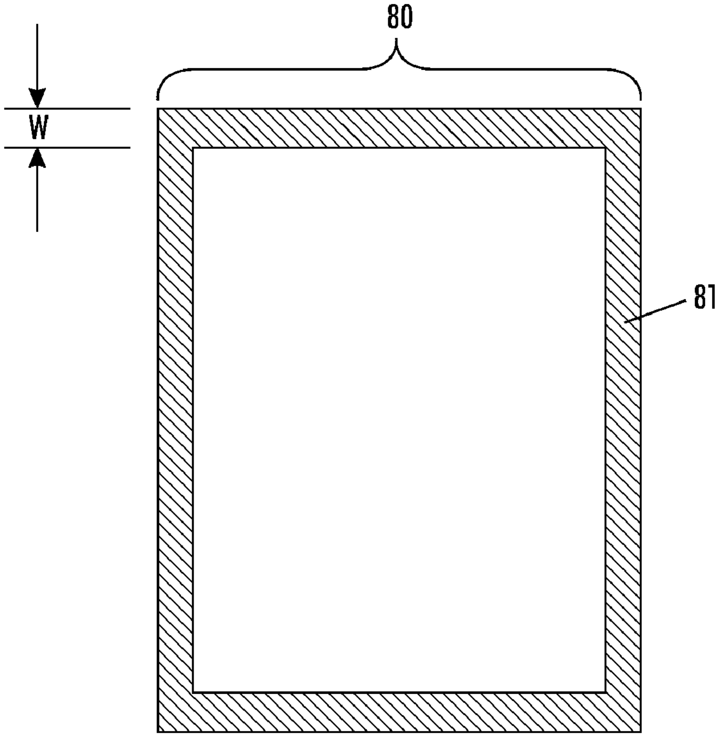
FIG. 8 is a schematical representation of a document page having a border with a width of "w"; and, FIG. 9 is a segment of the border from FIG. 8 depicting one possible exemplary arrangement of the present invention.

Regarding FIG. 8, in an embedding process, a page 80 is examined to see if its border area is blank. A page border area 81 is defined as shown in FIG. 8 where it is depicted as shaded area, and where "W" in the FIG. 8 is a pre-determined width, typically between 0.5 and 2 mm. All image content is cleared (set to white) in the defined page border area 81 if it is not already blank. As the cleared area is very narrow and is close to the page edge, it will very typically have no noticeable visual impact on the original document content.

Figure 9:
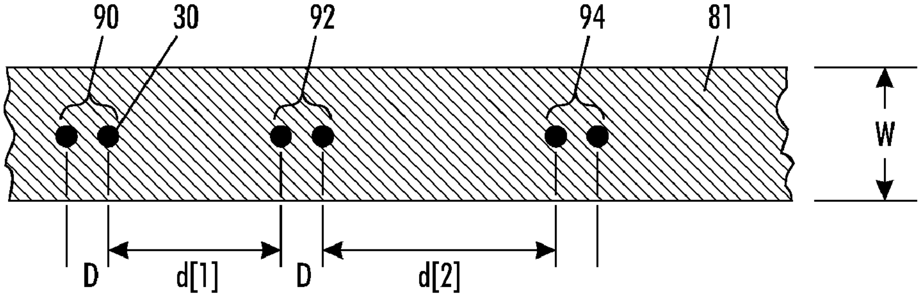

Then in the embedding process the proposed "no-scan" label is printed in the page border area 81. As shown in FIG. 9, which is an enlarged subsection of FIG. 8, the "no-scan" label is provided as a series of dots 30 arranged in dot pairs 90, 92, 94 in a one-dimensional sequence. The dot sequence is designed consisting of "M" pairs of closely located dots, where "M" is a design parameter. A larger "M" (i.e. more dots) increases the detection accuracy. However, it is constrained by the page size and the visibility of the dots. The typical range for "M" is 3-6. The dots 30 can be printed with any non-white ink, with a typical dot size of 1 pixel in 300 dpi. Parameter "D", as the distance between the dots in a pair, is another design parameter, which in an exemplary arrangement is typically between 3 to 8 pixels in 300 dpi rendering system. Too small a value "D" may make two dots in a dot pair 90, 92, 94 indistinguishable. As well, too large a value "D" may demand too much buffering space in detection.

The distances "d" between dot pair groups may also vary. These distances "d" are in an exemplary embodiment much larger (at least 2×) than is "D", typically in the range of 0.5-3 inches. We denote d[i] as the distance between the group i (dot pair 90) and group i+1 (dot pair 92). Again, d[i], for i=1, 2, . . . , M−1 is a set of design parameters, with the constraint that Σ d[i]+MD is necessarily smaller than the page size. The dot sequence may be repeated at one side of the page, if it has sufficient space, or printed on multiple sides.

Note the utilization of such "no-scan" or "no-copy" labels may also be applied in a logically inverted fashion. More specifically, instead of a "no-scan" label a "scanable" label is printed on each page so that it is allowed for copying/scanning, and copying/scanning is only permitted when such a "scanable" label is present upon a document page. The recognition of the system label could then also be employed to track exactly how many copies are made, and when and if authorization is active at the copier, as well as by who. In addition, the codes in the label could allow different permissions for usage. Furthermore, is that this proposed security mark can be combined with other visible or invisible security marking approaches, such as "secure mark" to provide additional protection. For example see U.S. application Ser. No. 11/317,768 cross-referenced and incorporated by reference above, entitled COUNTERFEIT PREVENTION USING MINIATURE SECURITY MARKS, by Zhigang Fan.

In the detection process when a document is scanned, the page border is first detected. As will be apparent to those skilled in the art, this can be accomplished by many known methods. Next it is then determined if the page border area is largely blank, or more specifically, if most pixels in the area have a color that is close to the page background. If this test is positive, a search is made in the defined page border area 81 for small dots whose colors deviate significantly from the background. If two such dots are found with a distance close to "D", and they are aligned along the page border 81, their coordinates are recorded. For all recorded dot pairs that are associated with the same edge of the page, the distances between dot pairs are evaluated and compared to the sequence of d[i], for i=1, 2, . . . , M−1. The "no-scan" label is then considered to be detected, if a match is found in distance d comparison.

In one exemplary arrangement in which a document page image is printed at 300 dpi. The design parameters applied are given as follows: W=1 mm; M=5 dot pairs; D=4 pixels; d[1]=200 pixels, d[2]=350 pixels, d[3]=390 pixels, d[4]=400 pixels. These no-scan labels are then rendered or printed at all four borders.

The exemplary embodiment has advantages in that it enables a relatively small number of marks to be unobtrusively disposed in a document and detected with high levels of accuracy using relatively simple and inexpensive detectors.

The claims can encompass embodiments in hardware, software, or a combination thereof. It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method for embedding information in a document comprising:

receiving a digital image data document page to be rendered;

checking a border area at an edge of the digital image data document page;

determining whether all the digital image data within at least a portion of the border area partitioned into blocks is blank;

clearing all the digital image data within at least a portion of the blocks of the border area if it is not blank to produce blank partitioned blocks;

receiving information to be embedded;

encoding the information to be embedded as a plurality of data carrying dot patterns, each dot too small to be visually noticeable;

determining whether a sufficient number of blank partitioned blocks are greater than or equal to a number of bits of information to be embedded, divided by a number of bits which can be embedded per blank partitioned block; and in response to a sufficient number of blank partitioned blocks existing:

embedding each of the plurality of data carrying dot patterns in the border area; and rendering the document with the embedded data carrying dot patterns.

2. The method of claim 1, further comprising:

prior to the encoding the information to be embedded, assigning a sequence to a plurality of the blank partitioned blocks; and assigning each of the plurality of data carrying dot patterns to each of the plurality of blank partitioned blocks according to the assigned sequence.

3. The method of claim 2, wherein each of the plurality of blank partitioned blocks in which a data carrying dot pattern is embedded has a same size.

4. The method of claim 3, wherein each of the plurality of blank partitioned blocks has a size of less than about 5 cm.

5. The method of claim 2, wherein each of the plurality of blank partitioned blocks is embedded with no more than one data carrying dot pattern.

6. The method of claim 1, wherein the rendering comprises printing the document with the embedded dot patterns on a recipient.

7. The method of claim 1, wherein each of the data carrying dot patterns comprises a plurality of miniature marks.

8. The method of claim 7, wherein each of the plurality of miniature marks has a size of no more than five pixels.

9. The method of claim 2, wherein the embedding includes for each of the blank partitioned blocks to be embedded with a data carrying dot pattern, considering each of the blank partitioned blocks as being subdivided into a two dimensional array of cells and for each of a plurality of marks in the data carrying dot pattern, assigning a separate cell in the two dimensional array of cells to the mark.

10. The method of claim 1, wherein each of a plurality of data carrying dot patterns is encoded as a font.

11. The method of claim 1, wherein the encoding of the information includes dividing the information into a plurality of portions and for each of the portions of information, accessing a data structure to retrieve a corresponding data carrying dot pattern.

12. The method of claim 11, wherein the data structure stores at least 100 data carrying dot patterns, each of the at least 100 data carrying dot patterns corresponding to a unique datum value.

13. The method of claim 1, further comprising for at least two of the plurality of blank partitioned blocks, embedding a registration dot pattern in the at least two blank partitioned blocks for enabling registration of the embedded data carrying dot patterns.

14. The method of claim 1, wherein the information encoded in the dot patterns, when rendered on a recipient, is retrievable by identifying a sequence of blank partitioned blocks in the border area for which an image content is no more than a predetermined threshold and for each of the blank partitioned blocks in the sequence, determining locations of miniature marks in each of the blank partitioned blocks and accessing a data structure with the determined locations.

15. A system for embedding information in a document comprising:

a memory;

a processor communicatively coupled to the memory for performing;

receiving a digital image data document page to be rendered;

checking a border area at an edge of the digital image data document page;

determining whether all the digital image data within at least a portion of the border area partitioned into blocks is blank;

clearing all the digital image data within at least a portion of the blocks of the border area if it is not blank to produce blank partitioned blocks;

receiving information to be embedded;

encoding the information to be embedded as a plurality of data carrying dot patterns, each dot too small to be visually noticeable;

determining whether a sufficient number of blank partitioned blocks are greater than or equal to a number of bits of information to be embedded, divided by a number of bits which can be embedded per blank partitioned block; and in response to a sufficient number of blank partitioned blocks existing:

embedding each of the plurality of data carrying dot patterns in the border area; and rendering the document with the embedded data carrying dot patterns.

16. The system of claim 15, further comprising:

prior to the encoding the information to be embedded, assigning a sequence to a plurality of the blank partitioned blocks; and assigning each of the plurality of data carrying dot patterns to each of the plurality of blank partitioned blocks according to the assigned sequence.

17. The system of claim 16, wherein each of the plurality of blank partitioned blocks in which a data carrying dot pattern is embedded has a same size.

18. The system of claim 17, wherein each of the plurality of blocks has a size of less than about 5 cm.

19. The system of claim 16, wherein each of the plurality of blank blocks is embedded with no more than one data carrying dot pattern.

20. The system of claim 16, wherein each of the plurality of miniature marks has a size of no more than five pixels.

21. The system of claim 16, wherein the embedding includes for each of the blank partitioned blocks to be embedded with a data carrying dot pattern, considering each of the blank partitioned blocks as being subdivided into a two dimensional array of cells and for each of a plurality of marks in the data carrying dot pattern, assigning a separate cell in the two dimensional array of cells to the mark.

22. The system of claim 15, wherein each of a plurality of data carrying dot patterns is encoded as a font.

23. A non-transitory machine readable medium encoded with a program for embedding information in a document, the program comprising instructions for:

receiving a digital image data document page to be rendered;

checking a border area at an edge of the digital image data document page;

determining whether all the digital image data within at least a portion of the border area partitioned into blocks is blank;

clearing all the digital image data within at least a portion of the blocks of the border area if it is not blank to produce blank partitioned blocks;

receiving information to be embedded;

encoding the information to be embedded as a plurality of data carrying dot patterns, each dot too small to be visually noticeable;

determining whether a sufficient number of blank partitioned blocks are greater than or equal to a number of bits of information to be embedded, divided by a number of bits which can be embedded per blank partitioned block; and in response to a sufficient number of blank partitioned blocks existing:

embedding each of the plurality of data carrying dot patterns in the border area; and rendering the document with the embedded data carrying dot patterns.

24. The machine readable medium of claim 23, further comprising:

prior to the encoding the information to be embedded, assigning a sequence to a plurality of the blank partitioned blocks; and assigning each of the plurality of data carrying dot patterns to each of the plurality of blank partitioned blocks according to the assigned sequence.

25. The machine readable medium of claim 24, wherein each of the plurality of blank partitioned blocks in which a data carrying dot pattern is embedded has a same size.

26. The machine readable medium of claim 25, wherein each of the plurality of blocks has a size of less than about 5 cm.

27. The machine readable medium of claim 23, wherein each of the plurality of blank partitioned blocks is embedded with no more than one data carrying dot pattern.

28. The machine readable medium of claim 24, wherein each of the plurality of miniature marks has a size of no more than five pixels.

29. The machine readable medium of claim 24, wherein the embedding includes for each of the blank partitioned blocks to be embedded with a data carrying dot pattern, considering the blank block as being subdivided into a two dimensional array of cells and for each of a plurality of marks in the data carrying dot pattern, assigning a separate cell in the two dimensional array of cells to the mark.

30. The machine readable medium of claim 24, wherein each of a plurality of data carrying dot patterns is encoded as a font.

* * * * *